(12) United States Patent
Dumcum

(10) Patent No.: US 6,192,554 B1
(45) Date of Patent: Feb. 27, 2001

(54) TIE STRAP

(76) Inventor: Russel L. Dumcum, 10201 Riverdale Rd. #207, Thornton, CO (US) 80229

( * ) Notice: Subject to any disclaimer, the term of this patent is extended or adjusted under 35 U.S.C. 154(b) by 0 days.

(21) Appl. No.: 09/191,627

(22) Filed: Nov. 13, 1998

(51) Int. Cl.7 .................................................. F16L 3/00
(52) U.S. Cl. ..................................... 24/16 PB; 24/30.5 P
(58) Field of Search ............................... 24/16 R, 16 PB, 24/30.5 P, 17 AP, 17 A; 248/74.3

(56) References Cited

U.S. PATENT DOCUMENTS

| | | | |
|---|---|---|---|
| D. 252,741 | 8/1979 | Taylor | D9/252 |
| D. 265,175 | 6/1982 | Lloyd | D8/394 |
| D. 370,407 | 6/1996 | Pietrowski | D8/394 |
| 1,810,027 | * 6/1931 | Moran et al. | 24/16 PB X |
| 3,197,830 | * 8/1965 | Hoadley | 24/16 PB |
| 3,438,095 | * 4/1969 | Evans | 24/16 PB |
| 3,581,347 | * 6/1971 | Verspieren | 24/16 R |
| 3,913,179 | 10/1975 | Rhee | 24/16 PB |
| 4,630,384 | * 12/1986 | Breen | 24/16 PB X |
| 4,817,837 | 4/1989 | Grover | 224/250 |
| 4,942,644 | 7/1990 | Rowley | 24/16 PB |
| 4,965,115 | * 10/1990 | Cimillo | 24/30.5 P X |
| 5,012,558 | 5/1991 | Willoughby | 24/16 PB |
| 5,274,847 | * 1/1994 | Lauttamus . | |
| 5,581,850 | 12/1996 | Acker | 24/16 PB |
| 5,745,958 | * 5/1998 | Kaldor | 24/16 R |
| 5,799,376 | * 9/1998 | Harsley | 24/16 PB |
| 5,906,033 | * 5/1999 | Mukaiyama | 24/16 R X |

* cited by examiner

*Primary Examiner*—James R. Brittain
(74) *Attorney, Agent, or Firm*—Thomas W. Hanson

(57) ABSTRACT

An adjustable, flexible tie strap with low insertion and release forces but which provides significantly greater holding force. A tapered head has rearwardly extending ears which engage the body of the strap to prevent withdrawal after the head is passed through a retaining hole in the strap. The design of the ears is such that the lock, or brace, against each other in response to tension on the strap, reducing distortion of the head and increasing the holding power. The strap may also have a tab for attachment to a cord or rope.

3 Claims, 9 Drawing Sheets

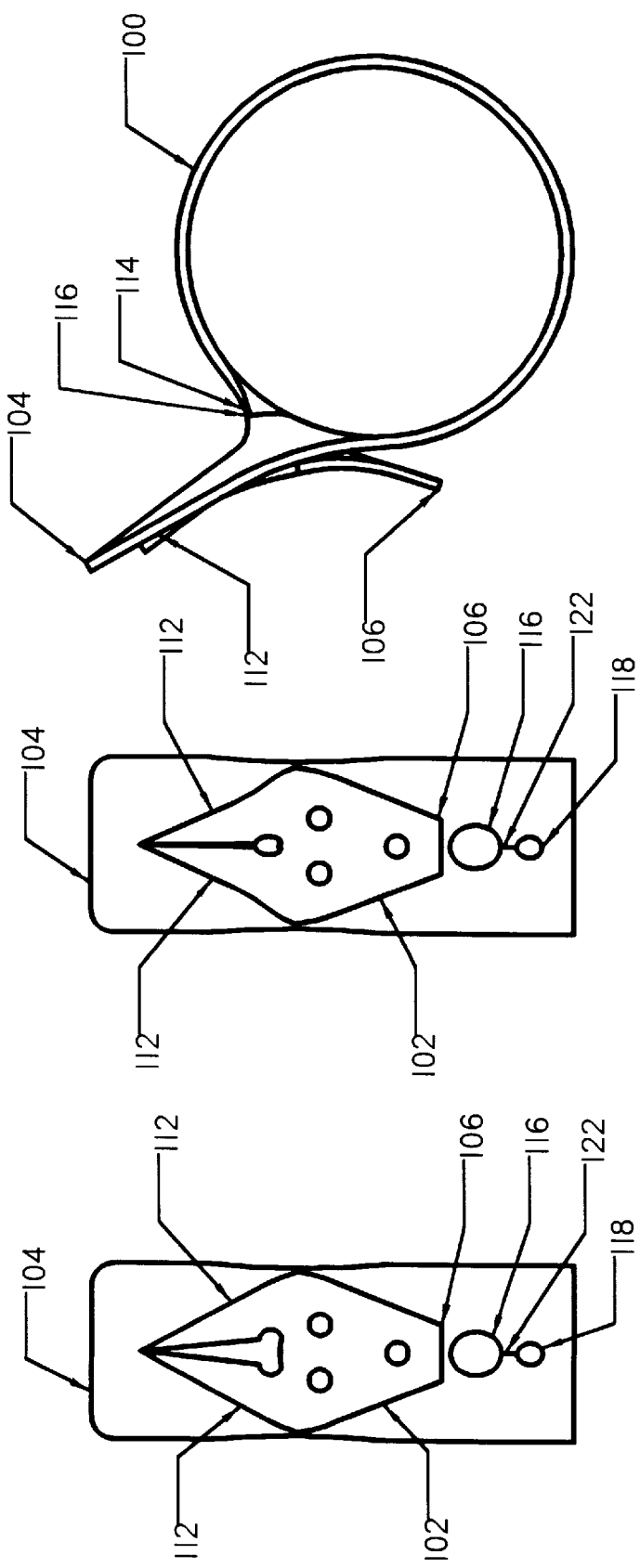

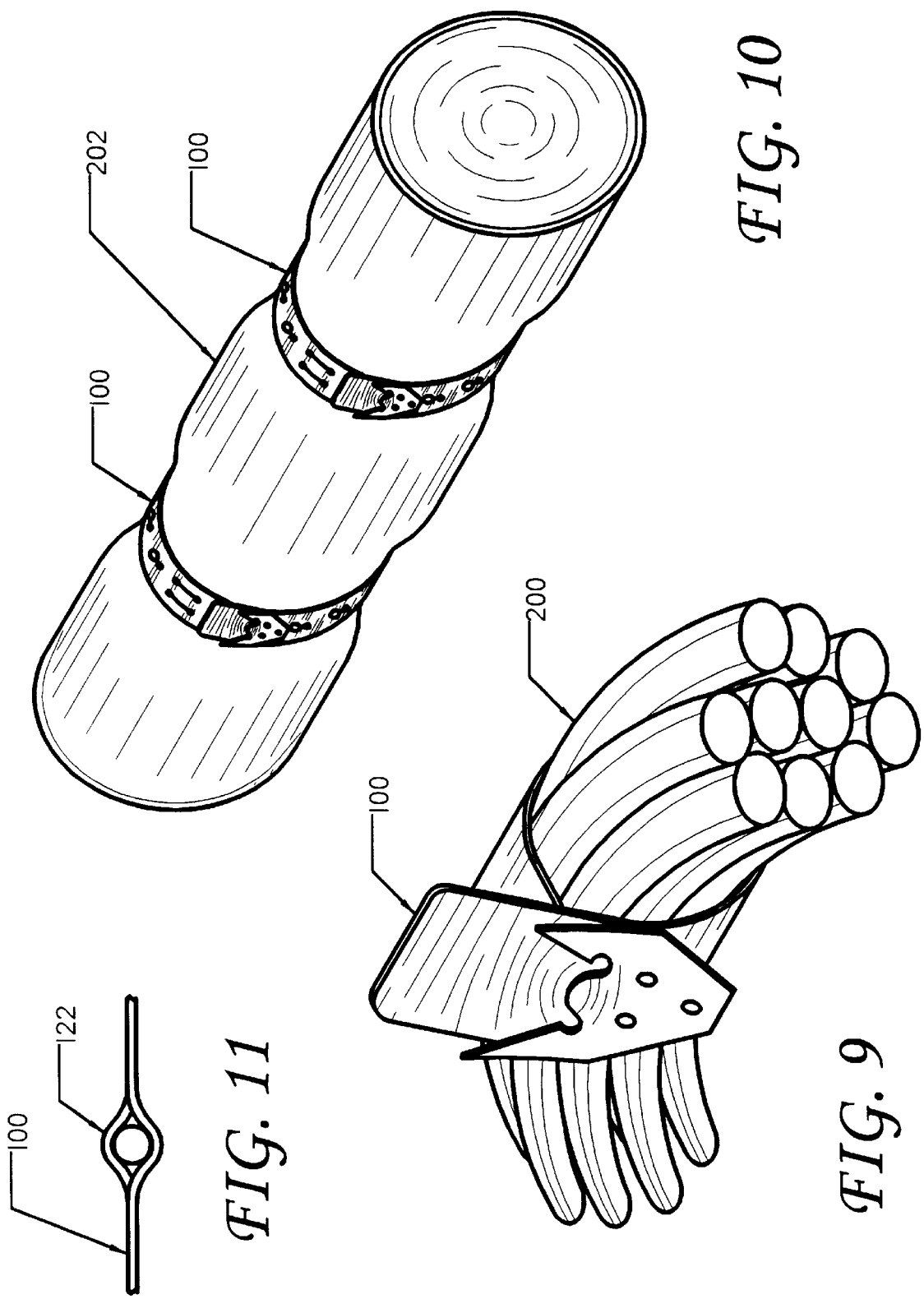

TIE STRAP

FIELD OF THE INVENTION

This invention relates to straps for bundling or securing items and more specifically to such straps which are elastic and adjustable in length and/or amount of force applied.

BACKGROUND OF THE INVENTION

The need to bundle items together for easier handling and carrying is centuries old. Until recently, ropes and cords tied around the items were the method of choice. These worked well, but suffered from several drawbacks. While fairly easy to fasten, by tying, the knots typically tighten under load and are difficult to release. Further, because the ropes and cords have only limited elasticity, if the bundle shifts or compresses, the rope may loosen. These, and other, drawbacks have motivated a continued search for a better strap for tying items into bundles.

More recent approaches include the use of elastic cord, often called shock cord or bungee cord. While solving the problem of the lack of elasticity in conventional rope, elastic cord is difficult to fasten. Because of its elastic nature, knots tend to either work loose, or bind, depending on the nature of the cord and the knot used. To solve this, a variety of fasteners have been used. The most common is a simple hook affixed to each end of the cord or a hook through which the cord passes, allowing adjustment of the length of the cord. These solve the fastening problem, but introduce a new problem. The hooks tend to snag on soft items, such as textiles, and to scratch or abrade hard items. This is especially true of the fixed hooks which are often made of formed metal wire. The end of the wire is often exposed, presenting a sharp edge.

Various forms of adjustable tie down straps have also been used. These typically have a hook at each end and an adjustment/tensioning device in the middle. The adjustment device may be a simple cam lock or a ratchet device. These are well suited to restraining heavy loads, especially when hauled by truck or tractor-trailer, but are generally not suited to tying items into bundles. These straps also pose a risk of abrasion or scratching by the hooks and adjustment mechanisms.

Any of the approaches which utilize metal components also pose a risk of sparking. While often not a concern, these straps are not suitable for those (circumstances where the environment may contain high levels of combustibles. This would be true of many petroleum product or chemical handling environments. Unfortunately, elastic materials are difficult to couple without some type of hardware component. While plastic i s usable, it is often bulkier or weaker than metal.

Several US patents have been issued on straps and ties which do not use additional hardware components for fastening. U.S. Pat. No. 3,913,179 to Rhee is typical of such. It discloses a tie strap made of a flexible material, such as plastic, which uses slots in the strap and a barbed head to provide a connection. While solving some of the above problems, it is not a complete solution. The strap is easily fastened because the head can be inserted at an angle into the T-slot and then rotated into position. However, this approach would not work if an elastic material were to be substituted for the preferred plastic. The slots are too large relative to the head of the strap and would easily deform to allow the head to be withdrawn. The barb uses 90 degree ledges at the rear which work well with a rigid retaining slot but which provide insufficient grip for use with elastic material. Because the material can not be truly elastic with this approach, the straps still exhibit the problem of loosening if the bundle shifts or compresses. Additionally, if the load limit of the strap is exceeded, there is little or no indication prior to a sudden release of the coupling or snapping of the strap itself.

U.S. Pat. No. 5,581,850 to Acker is similar in many respects to the Rhee patent. A flexible, but not elastic material is used, with a barbed head passing through an elongated slot in the strap. As in Rhee, the barb uses right angle ledges. The barb profile and the size of the slots combine in a design which will not work with an elastic material. The slot would easily deform to allow withdrawal of the head.

U.S. Pat. No. 5,012,558 to Willoughby does present a design utilizing an elastic material. Here too, the barb uses a ledge which is at right angles, or even less. A retaining hole which is very small relative to the size of the head is used to avoid the above problems with deformation. Further, the strap is designed to pass the head through multiple holes in order to achieve the desired retention force. Unfortunately, this design requires significant force to insert the head of the strap into each of the holes. Withdrawing the strap from the holes when the user desires to release the strap requires greater force because they are working against the barb. Generally the same amount of force will be required to release the strap intentionally as it supplies for holding items together.

There is a need for a tie strap which can be made from an elastic material and which can be reliably connected to itself, or another strap, without the use of additional hardware components. It should be easy to make the connection and to release the connection when desired. However, it should be very difficult for the strap to release on its own when in use within proper load limits. Preferably, the strap would be compact and easily stored. Ideally, the strap will require significantly less force to release it than it can resist when holding a load. Ideally, the strap would provide a visual indication as load limits are approached and would release smoothly, rather than breaking, when the load limit is exceeded. Also ideally, the strap would be made from a single material and would require no bonding or other connections, in order to reduce manufacturing complexity and cost.

SUMMARY OF THE INVENTION

The present invention is directed to an apparatus for tying or bundling items together for easier handling and transportation. The strap consists of a single piece of elastic material with one end formed into a head and one or more holes provided in the body or tail of the strap. The head is provided with rearward extending ears which engage the body of the strap after the head is inserted through one of the holes. These ears extend significantly farther back than do conventional barbs currently in use. This provides increased holding power. The holding power is increased by the unexpected feature that the ears lock against each other as the head distorts due to tension on the strap.

According to an aspect of the invention the ears extend rearward from the head, not extending beyond the edges of the strap.

According to another aspect of the invention the strap may utilize angled shoulders which taper from the body of the strap to the narrowed neck of the strap. The inner edges of the ears may be parallel to the angled shoulder.

According to yet another aspect of the invention the strap may be provided with an additional hole in the nose area of the head portion to allow hanging of the strap. This hole may be matched in size and spacing with the retaining holes in the body of the strap to allow the hole in the nose and a hole in the body to be simultaneously passed over the same nail or hook, while the strap is fastened, to reduce the strain on the coupling.

Further in accordance with the invention the strap may be provided with a tab formed in the body of the strap allowing it to be semi-permanently attached to a cord or rope so that it does not become lost when released.

The advantages of such an apparatus are that it is easily manufactured from a single sheet of elastic material, it is easily packages and stored in a very compact space. The connection can be made and released with minimum force while providing a significantly higher holding force. Since no additional hardware components are required, there is no risk of snagging, scratching, or sparking due to contact with the load or items in the environment. The strap releases smoothly when the load limit is exceeded and provides a clear visual indication as that limit is approached.

The above and other features and advantages of the present invention will become more clear from the detailed description of a specific illustrative embodiment thereof, presented below in conjunction with the accompanying drawings.

BRIEF DESCRIPTION OF THE DRAWINGS

FIG. 6 illustrates the fastened strap under light tension looking at the head of the strap.

FIG. 7 illustrates the fastened strap under heavy tension looking at the head of the strap.

FIG. 8 illustrates the fastened strap under heavy tension viewed from the side.

FIG. 9 illustrates the strap in use restraining a coil of rope or electric cord.

FIG. 10 illustrates a pair of straps in use binding a roll of material.

FIG. 11 provides a side view of the strap illustrating the attachment tab.

FIG. 17 illustrates the strap used as a closure for a saddle bag or the like.

DETAILED DESCRIPTION OF THE INVENTION

The following discussion focuses on the preferred embodiment of the invention, in which a single-headed strap is utilized for bundling various articles. However, as will be recognized by those skilled in the art, the disclosed apparatus is applicable to a wide variety of situations in which a strap is to be joined to itself or to another strap in order to retain or restrain a load.

The following is a brief glossary of terms used herein. The supplied definitions are applicable throughout this specification and the claims unless the term is clearly used in another manner.

Body—that portion of the strap between the head and the tail. Generally that portion will have the retaining holes and the attachment tab.

Head—the tapered end of the strap which is inserted into the retaining holes.

Neck—narrow portion of the strap immediately behind the head.

Nose—the tapered point of the head.

Retaining holes—holes spaced along the length of the strap which are adapted to receive the head of the strap. In the preferred embodiment these are each paired with a second hole of unequal diameter joined by a slit to ease insertion of the head. They could also be single holes or pairs of equally sized holes.

Shoulder—the angle portion of the strap extending from the neck to the body of the strap. In the preferred embodiment a constant angle is used, but a series of two or more stepped angles or a curve could also be used.

Tail—the end of the strap opposite the head.

Ears—that portion of the head of the strap which angles toward the rear, extending outwardly from the neck. The ears function in a similar manner to barbs, but with distinct advantages.

Preferred Embodiment

The disclosed invention is described below with reference to the accompanying figures in which like reference numbers designate like parts.

Figure 1:
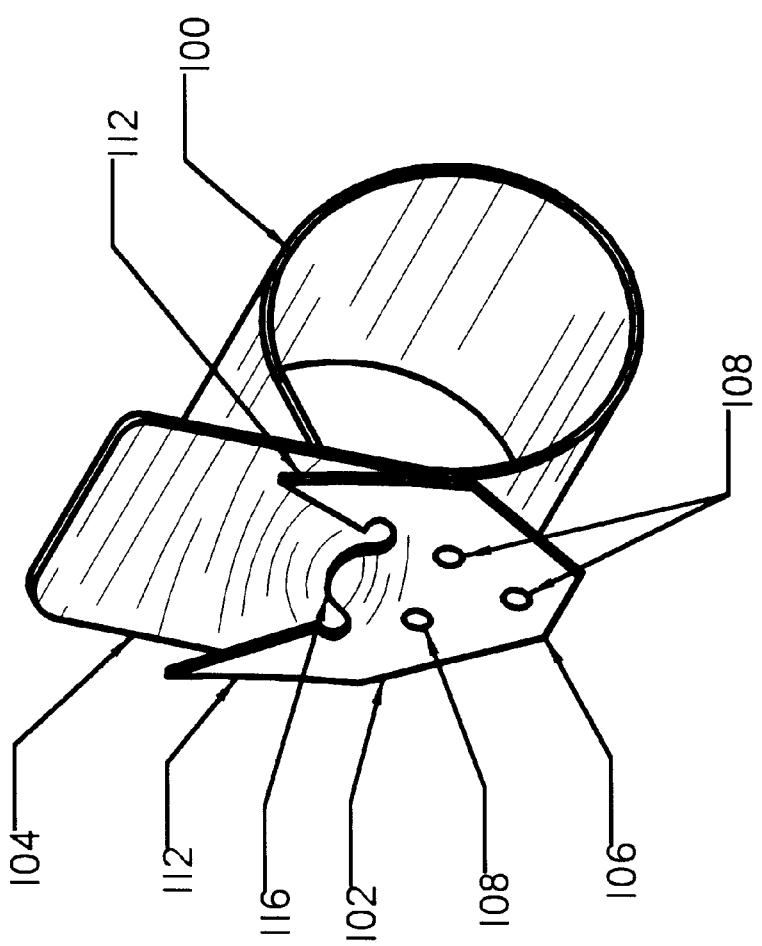
FIG. 1 provides a perspective view of the invention in its fastened position FIG. 2 provides a top view of the invention in its unfastened position.

FIG. 1 provides a perspective view of the strap, 100, as it would appear when fastened, but not in use restraining any items. The general form of the strap is seen, with the head, 102, and tail, 104, clearly visible. The version illustrated is a relative short strap as would be appropriate for holding a coiled electrical cord or rope. The strap can be manufactured in a variety of lengths adapted to hold bundles of items from a few inches to a few feet in diameter. There is no reasonable upper limit to the length of strap that can be made. The design is readily adaptable to straps 20 feet or longer for use as tarpaulin tie downs for tractor-trailer rigs.

Figure 2:
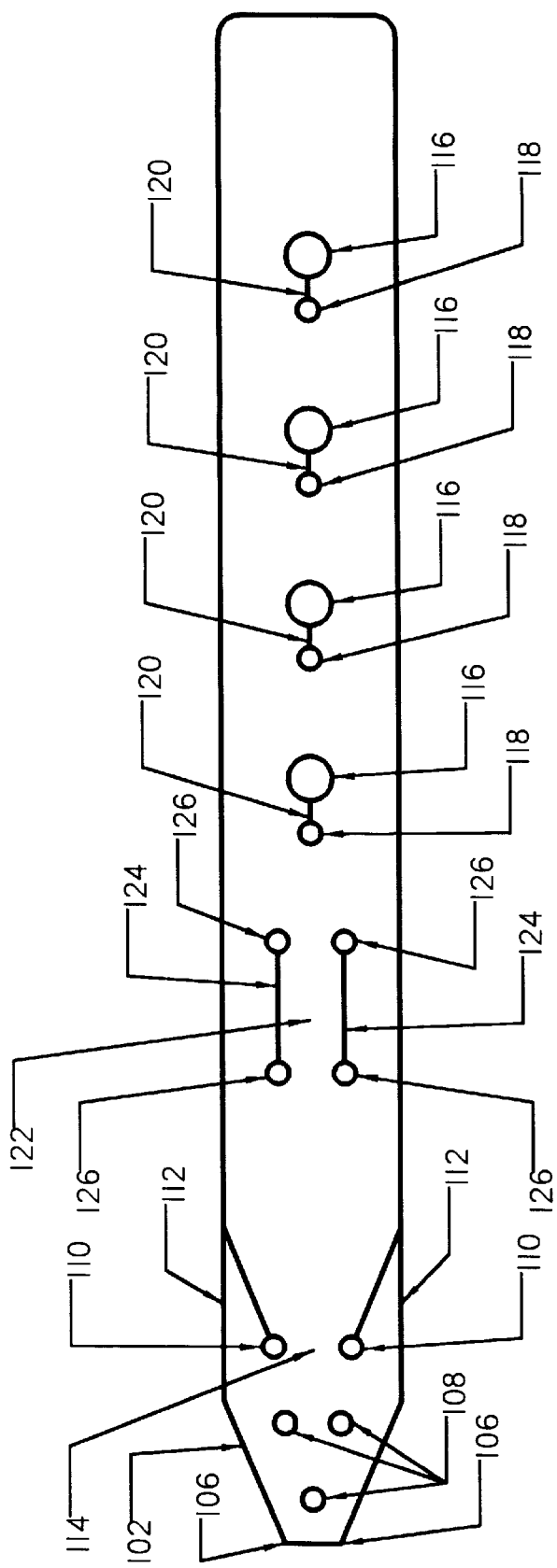
Figure 3:
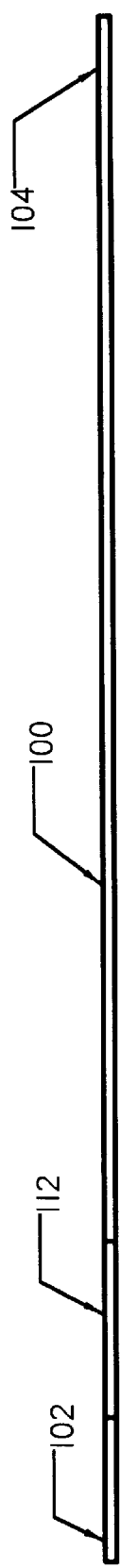
FIG. 3 provides a side view of the invention in its unfastened position.

FIGS. 2 & 3 provide a plan view and a side view, respectively, of the strap, 100, as it appears when laid flat. This is also how it appears when manufactured. The head, 102, is formed at one end of the strap opposite the tail, 104. The head is tapered to a blunt point, 106, or nose. The taper eases insertion of the head into the retaining holes. The holes, 108, are primarily decorative, serving to strengthen the visual appearance of an animal's head. As discussed below, the "nose" hole could be adapted for use in hanging the strap by enlarging it.

Figure 5:
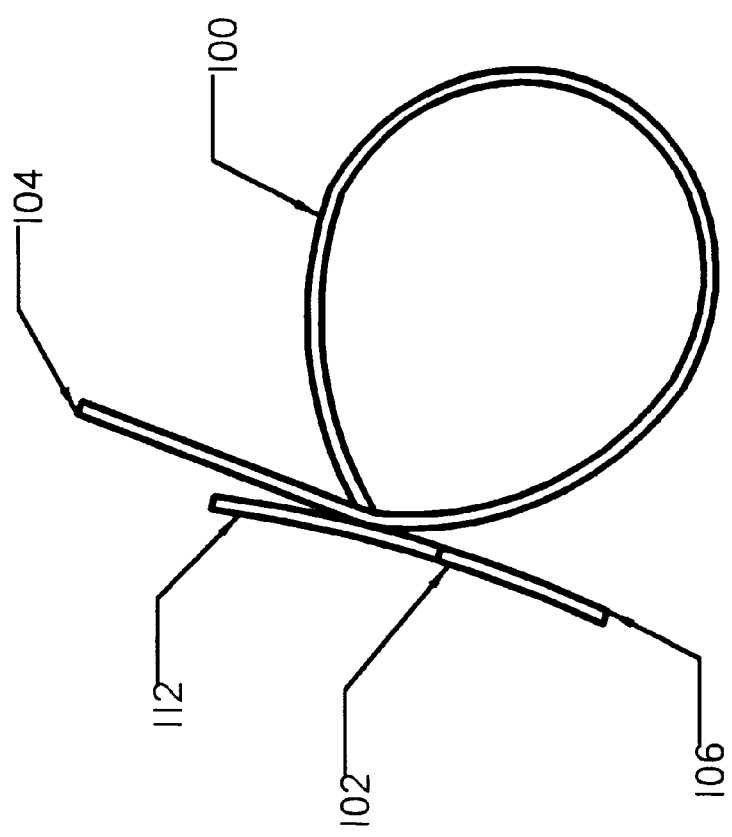
FIG. 5 illustrates the fastened strap in a relaxed state viewed from the side.
Figure 4:
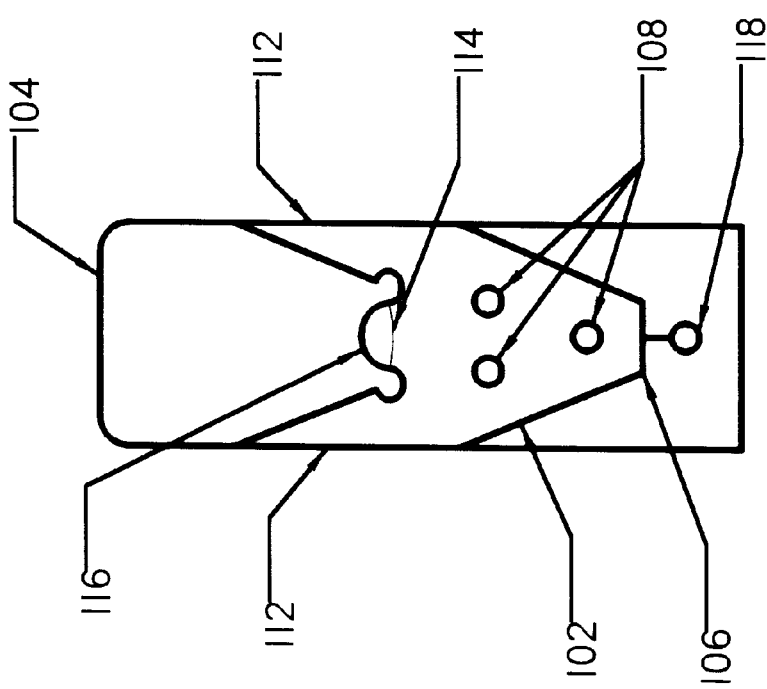
FIG. 4 illustrates the fastened strap in a relaxed state looking at the head of the strap.

The ears, 112, are a significant feature of the strap. They are formed by rearward slanting slits extending outwardly from the neck to the outer edge of the strap. Holes, 110, serve as stops for the inner end of the slit, preventing it from tearing further. When the head is inserted into the retaining hole, 116, the ears fold freely inward reducing the size of the head as it passes through the retaining hole. Referring to FIGS. 4 and 5, it can be seen that the ears function much as a conventional barb, resisting withdrawal of the head through the retaining hole. As seen in FIG. 5, the ears and nose, 106, extend significantly beyond the periphery of the retaining hole providing a T-shaped connection similar to that offered by a toggle bolt. This is different than a conventional barbed head in which the barb and head are entirely on the same side of the hole.

FIGS. 6 through 8 illustrate a unique feature of the inventive strap which becomes apparent as the load on the strap is increased. When the strap is under a light load, or no load, the head appears as shown in FIGS. 4 and 5. However, as the load increases, the head, 102, attempts to pull out of the retaining hole, 116. As this is resisted by the ears, 112, the strap around the retaining hole, and the head, deform, curving inward and the periphery of the retaining hole distends inwardly. These deformations and their accompanying forces result in the ears being forced inwardly until they make contact as shown in FIG. 6. Although having a relatively thin cross section, the ears are assured to meet in the same plane because they are forced backward to lie flush against the upper surface of the strap behind the retaining hole. Initially, the tips of the ears make contact as shown in FIG. 6. As the outward force against the strap increased, the distortion of the strap and the head increases. As the distortion increases, the contact area between the ears increases, until they are in contact along their entire inner surface as shown in FIG. 7. At this point the ears are firmly braced together, resisting further deformation of the head. As the force increases further, proportionately less deformation occurs for each unit increase in forces than occurred before the ears made contact. This significantly strengthens the head and increases the resistance to being withdrawn through the hole. This increasing resistance is a significant difference from a conventional barb which maintains a constant, or sometimes decreasing resistance to withdrawal as the force increases.

The progressive deformation illustrated in FIGS. 4 through 8, and discussed above, also serves as a safety feature by providing a visual indication of the amount of load on the strap. As FIGS. 4, 6, and 7 illustrate, the deformation is readily apparent when viewing the face of the strap. As FIGS. 5 and 8 illustrate, the deformation is also visible from the side of the strap. This deformation is easily seen and understood by even a novice user of the strap and provides a warning that the load limit of the strap is being approached well ahead of the actual failure point of the strap.

Referring to FIGS. 2, 6, and 7, the structure of the retaining holes can be seen. In the preferred embodiment, a pair of holes, 116 and 118 are used, joined by a slit, 120. This allows the retaining hole, 116, to be kept relatively small while greatly easing the insertion of the head. The offsetting decrease in holding power is relatively small. The second hole increases the area available for insertion and serves as a stop for the slit to prevent tearing. Preferably the retaining hole is slightly smaller in diameter that the width of the neck, 114. This allows the amount of material in the neck and around the retaining hole to be maximized. The size of each can be adjusted to balance the material in the neck against the material around the hole, to match the specific type, width, and thickness of material being used. Alternatively, a single hole can be used, eliminating the slit and the second hole. This simplifies the design slightly and increases the holding power while making it more difficult to insert the head into and release it from the retaining hole.

Referring to FIG. 2, the attachment tab, 122, can be seen. It is formed by two parallel, spaced apart slits, 124, with stop holes, 126. The attachment tab allows the end of a rope, cord, or rod to be passed through the opening formed by raising the tab above the body of the strap, as shown in FIG. 11. In this manner, the strap is semi-permanently attached to one strand of a coil or one item of a set that is to be bundled together for storage. The use of an elastic or semi-elastic material for the strap allows the opening under the tab to stretch to accommodate larger diameters such as needed for a plug on the end of an extension cord. Lubricant, such as soapy water or glycerol can be used to ease the insertion of a large plug.

In the preferred embodiment, the strap is die cut from a semi-elastic rubber membrane. The design of the strap is such that the straps can be placed immediately adjacent to one another both side by side and end to end, resulting in very little waste material. Both stamp dies and rotary dies can be used, resulting in extremely low manufacturing costs. One material that has been found to work well is EPDM rubber membrane as used in roofing systems. In a 0.060" thickness, this material provides an appropriate balance of elasticity and strength. In addition, this material has high resistance to deterioration induced by exposure to ultraviolet light. Other elastic sheet and tape materials could also be used as would be clear to those skilled in the art. In appropriate weights, leather also performs well.

FIGS. 9 and 10 illustrate the strap in use for two of its many possible applications. In FIG. 9 the strap, 100, has been fastened around a coiled wire or rope, 200. Note that the strap illustrated is the ideal length for the application, resulting in no distortion as discussed herein and a minimal amount of tail hanging loose. In FIG. 10 a pair of straps, 100, have been used to secure a longer bundle, 202, such as a rolled tarpaulin or sleeping bag.

The design of the strap is such that it is very easy to use. Because the strap is identical when viewed from the top and bottom it can be used with either surface as the inside when fastened. It works equally well either way. Further, it will also work if the head is twisted 180 degrees relative to the tail. Thus, if the user is in a hurry, the strap can be passed around a bundle and fastened without checking for twists. Fastening involves merely pulling the head fully through the retaining hole which provides the desired tension and releasing it. The tension of the strap will pull the head backward into the retaining hole with the ears snug against the outer surface of the strap. If a stronger grip is desired, the head of the strap can be passed through two sequential retaining holes. A stronger grip can also be achieved by first fastening the strap and then twisting the strap so that the head an tail are position to the inside, adjacent the load. This inhibits distortion and movement of the head, increasing the force needed to pull it through the retaining hole.

Figure 12:
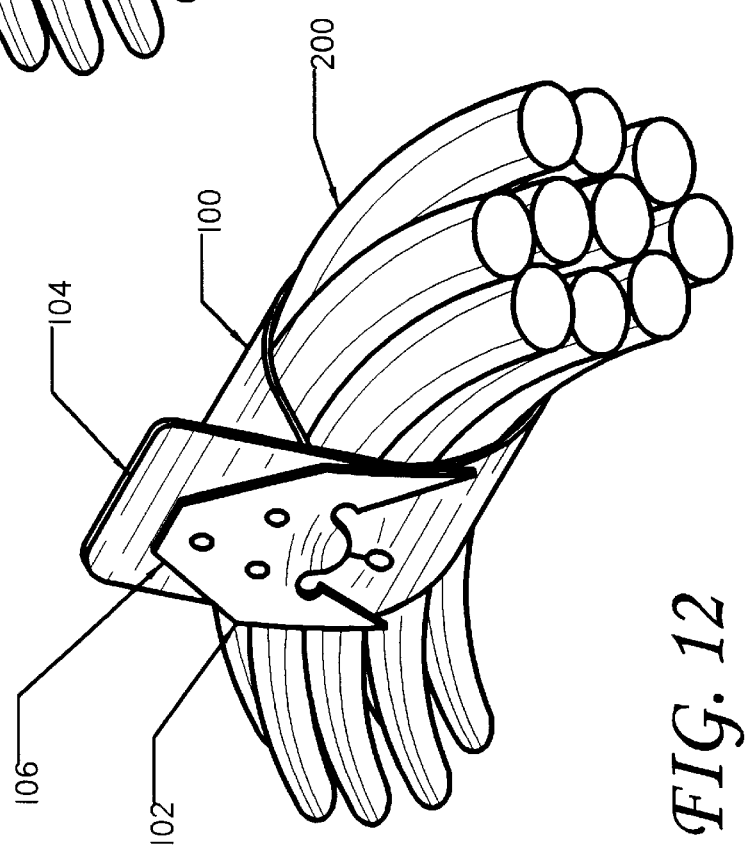
FIG. 12 illustrates the strap with the head inverted.

Releasing the strap is also quite easy. While the fastening mechanism of the strap can resist a significant amount of force, only a relatively small force will release the strap. This is done by grasping the tail of the strap and pulling it at an angle, forward over the ears. This causes the ears and the head to collapse inward, reducing their size, while simultaneously stretching the retaining hole. The head then easily passes through the retaining hole, releasing the strap. The design of the strap also provides several safety features. As discussed above with reference to FIG. 8, the deformation of the head and of the strap around the retaining hole provides a visual indication of the amount of load on the strap. If the load limit of the strap is actually exceeded, the strap will release rather than snapping. With an excessive load, the head will collapse inward and the retaining hole will elongate, allowing the head to withdraw from the retaining hole. This provides a more gradual release than if the strap were to break, reducing backlash, and preserves the integrity of the strap, allowing it to be reused. A further safety feature is that if the head becomes inverted, as shown in FIG. 12, with the nose, 106, pointing back toward the tail, 104 of the strap, it will still hold, although the load capacity is somewhat reduced. Also, since the strap is manufactured entirely from elastic material, with no rigid metal or plastic parts, it is non-scratching, non-abrasive, won't snag on material, and is non-conductive and non-sparking, making it appropriate for a wide range of loads and working conditions.

Figure 13:
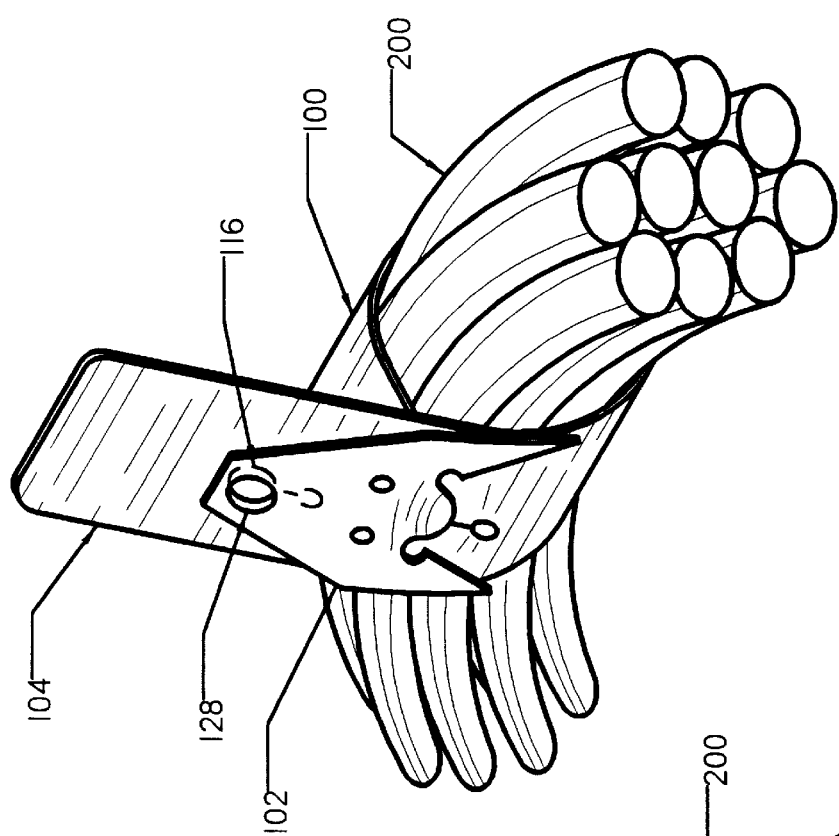
FIG. 13 illustrates an alternative embodiment of the strap with an enlarged and repositioned nose hole.

While designed primarily for restraining bundled loads, the strap may also be used to hang items. This is especially true where the strap is fastened around an extension cord or a coil of rope. Which the user then desires to hang on a wall. Any of the retaining holes can be placed over a nail or hook to suspend the item(s) the strap is holding. A more permanent mounting can be achieved by nailing or screwing the strap to the wall, preferably through a retaining hole, and then bringing the load to the strap and fastening it normally. Alternatively, the "nose" hole in the head, 128, could be enlarged and used to hang the strap, as shown in FIG. 13. This would be especially beneficial if the relative spacing of the nose hole is altered, increasing the distance from the neck to the nose hole. If this distance is matched to the distance between adjacent retaining holes, the head can then be inverted, pointing toward the tail, and the nose will align with the retaining hole, 116, adjacent to the one through which the head was passed to fasten the strap. Both holes can then be placed over a nail or hook resulting in the weight of the bundled items being supported equally by both ends of the strap. The fastening mechanism then only serves to hold the strap closed, and does not support the bulk of the weight of the items, increasing the weight that can be hung.

The flat design of the strap is beneficial in packaging, shipping, and storage of the strap. The strap is essentially two-dimensional when not in use and occupies very little space. As such it lends itself to a variety of packaging techniques. Shipping cost is also reduced as the packages can then be packed very densely. In use, the same characteristics mean that a large number of straps can be stored in a very small space. This makes it easy to take along sufficient straps for any task and to easily carry spares.

The inventive straps lend themselves to a variety of applications in addition to bundling of items or restraining rolled material. They can also be used as emergency tourniquets or to hold bandages or splints in place; as a book strap; even as an emergency belt if need be. They are especially handy for campers and backpackers because they take up so little space that a few extra can always be packed for those unforeseen circumstances that always seem to arise.

Alternative Embodiments

Figure 14:
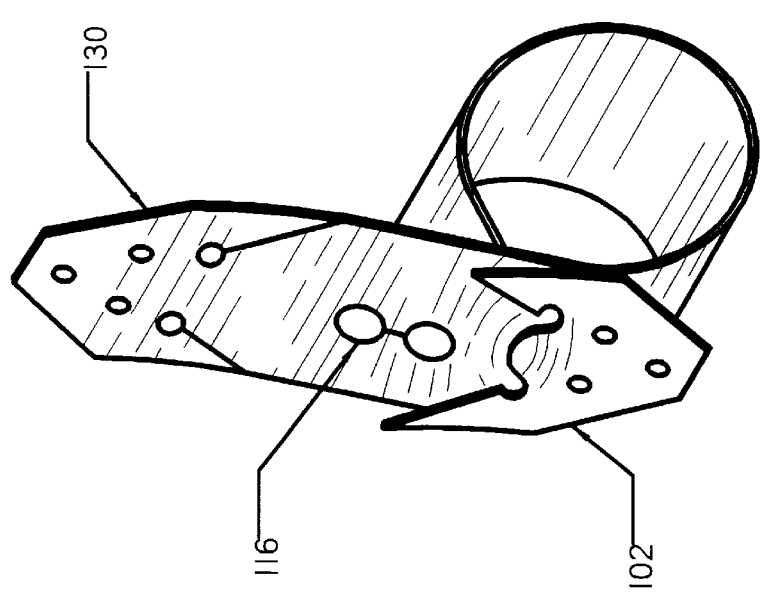
FIG. 14 illustrates an alternative double-headed embodiment of the strap.
Figure 15:
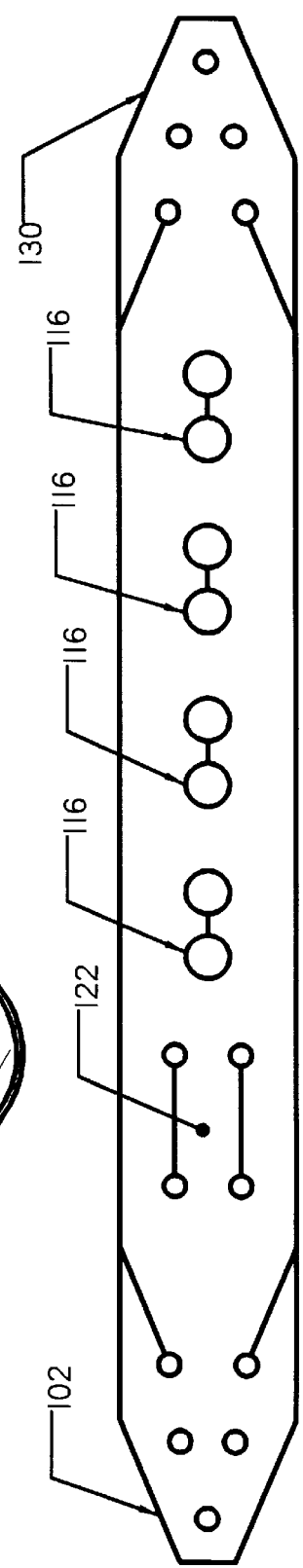
FIG. 15 provides a plan view of the double-headed embodiment.
Figure 16:
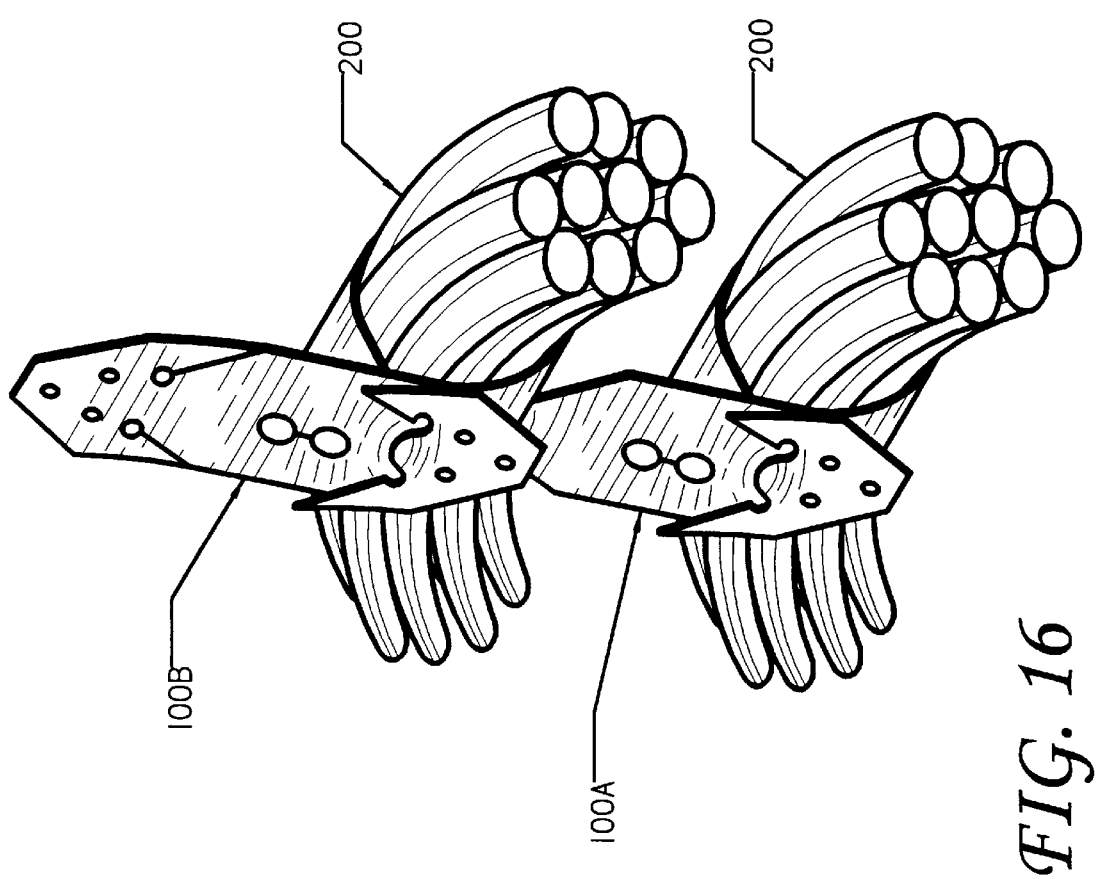
FIG. 16 illustrates the double-headed embodiment in use interconnecting separate bundles.

In an alternative embodiment, the strap can be made double-headed as shown in FIGS. 14 and 15, with the second head, 130, replacing the tail. In this embodiment, the strap may be made with a single attachment tab, 122, as shown, with a tab at each end, or with no tabs, depending on the anticipated application. The retaining holes, could be made with two equal sized holes as shown or could use a single hole, to allow use by either head. This embodiment offers several advantages. First, either end may be used as the head, allowing the user flexibility in orienting the strap or merely allowing the user to grab whichever end is nearest and inserting it into a retaining hole. Second, the strap offers redundancy in that if one end of the strap breaks off, or is cut off, the strap can continue to function using the second head. Further, if two shorter straps are needed, the strap can be cut into two straps of appropriate length, each having a single head and a set of retaining holes. As FIG. 16 illustrates, the second head can also be used to connect a first strap, 100A, to an adjacent second strap, 100B, by inserting it into a retaining hole of the second strap. In this manner several bundles which are held together by straps can then be interconnected into a single larger bundle for easier handling or for grouping of related items. This is especially applicable in computer or audio applications where all of the cables for a particular device could be grouped together, yet still individually tied.

Figure 17:
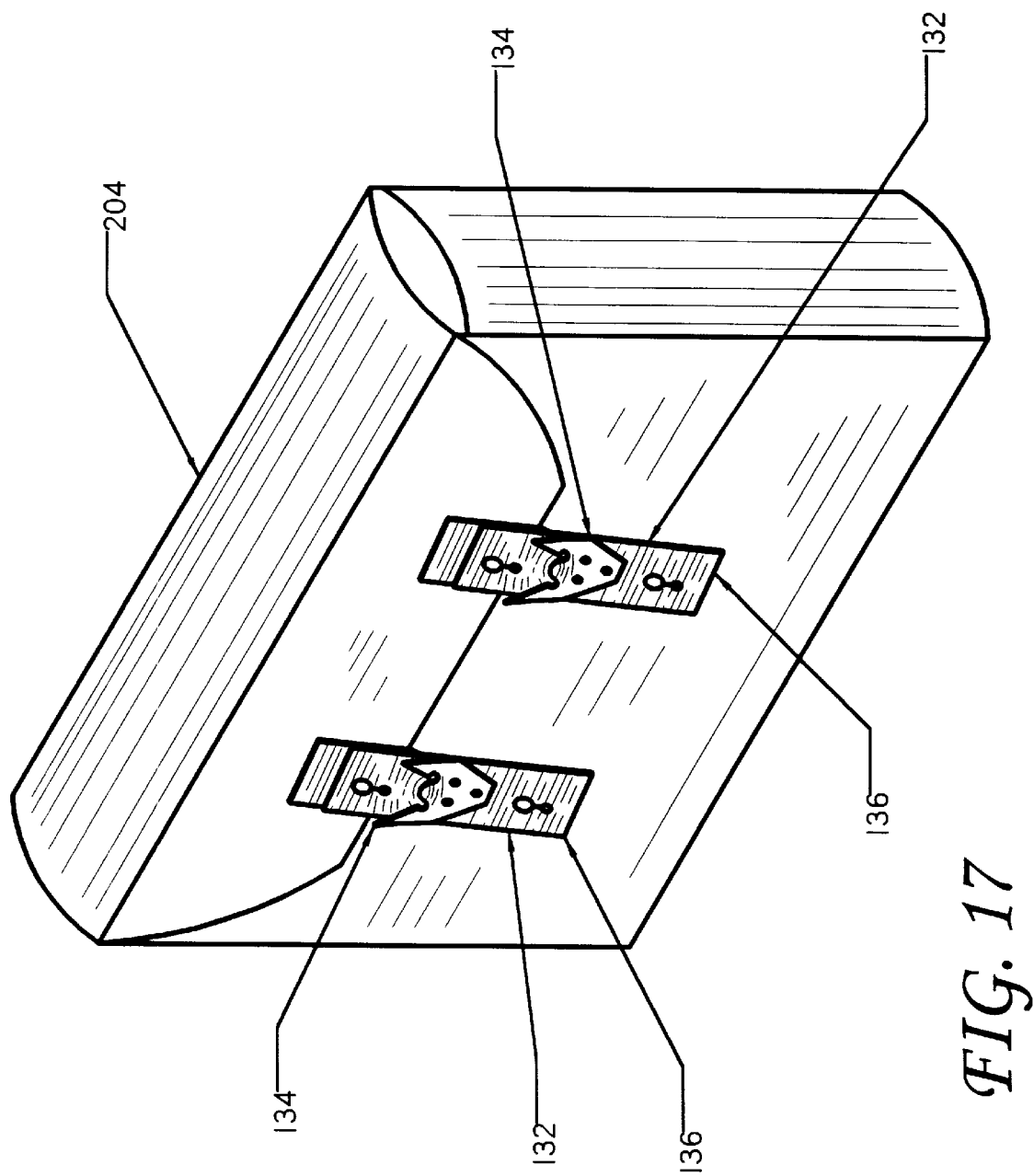

A further alternative is use the strap as a fastening device for a saddle bag, purse, or the like. As shown in FIG. 17, the tail portion, 136, is attached to the body of the bag, and the head portion, 134, attached to the flap. These may, of course, be reversed. The flap is then retained in a closed position by fastening the strap, 132, as described above. This provides an adjustable, elastic fastening device which is non-marring, non-abrasive, and very strong. Where desired, the material for the strap can be matched to the material of the bag.

While the preferred form of the invention, and some alternatives have been disclosed above, further alternative methods of practicing the invention are readily apparent to the skilled practitioner. The above descriptions are intended to be illustrative only and not to limit the scope of the invention.

What is claimed is:

1. A tie strap comprising:
    (a) an elongated strip of flexible material having a first head end, a body portion, and a narrowed neck joining said head to said body;
    (b) plural ears attached to said head, extending beyond said neck toward said body;
    (c) said body having at least one retaining hole adapted to receive said head,
    (d) said body having at least one second hole, adjacent to each of said retaining holes and a slit connecting each said retaining hole to said adjacent second hole; and
    wherein said second hole is of substantially different diameter than said retaining hole.

2. A tie strap comprising:
    (a) an elongated strip of flexible material having a first head end, a body portion, and a narrowed neck joining said head to said body, said head having a proximal and a distal end;
    (b) plural ears attached to said head, extending beyond said neck toward said body;
    (c) said body having at least one retaining hole adapted to receive said head,
    (d) said head defining a hanging hole near its distal end at a first distance from said neck; and
    (e) said body having at least two spaced apart retaining holes having a separation distance between their respective centers and wherein said first distance from said neck to said hanging hole is substantially equal to said separation distance.

3. A tie strap comprising:
    (a) an elongated strip of flexible material having a body portion, a first head end, a narrowed neck connected to said head, and an angled shoulder portion connecting said neck to said body portion;
    (b) said head being tapered to form a narrowed nose at its distal end;

(c) a pair of ears attached to said head, extending beyond said neck toward said body;

(d) said body having at least one retaining hole adapted to receive said head;

(e) said head defining a hanging hole near said nose; and (f) said body having at least two spaced apart retaining holes having a separation distance between their respective centers and wherein the distance from said neck to said hanging hole is substantially equal to said separation distance.

\* \* \* \* \*